(No Model.)

R. COWEN.
PNEUMATIC TIRE.

No. 596,741. Patented Jan. 4, 1898.

Witnesses:
Edward F. Allen.
Thomas J. Drummond.

Inventor:
Robert Cowen
by Crosby Gregory,
Attys.

THE NORRIS PETERS CO., PHOTO-LITHO., WASHINGTON, D. C.

UNITED STATES PATENT OFFICE.

ROBERT COWEN, OF CAMBRIDGE, MASSACHUSETTS, ASSIGNOR TO THE BOSTON WOVEN HOSE AND RUBBER COMPANY, OF BOSTON, MASSACHUSETTS.

PNEUMATIC TIRE.

SPECIFICATION forming part of Letters Patent No. 596,741, dated January 4, 1898.

Original application filed January 13, 1896, Serial No. 575,307. Divided and this application filed June 12, 1896. Serial No. 595,272. (No model.)

*To all whom it may concern:*

Be it known that I, ROBERT COWEN, of Cambridge, county of Middlesex, State of Massachusetts, have invented an Improvement in Pneumatic Tires, of which the following description, in connection with the accompanying drawings, is a specification, like letters on the drawings representing like parts.

This invention relates to tires, particularly to novel pneumatic tires for vehicle-wheels—such, for instance, as bicycles and the like.

The prime object of my invention is to provide a tire of or containing rubber with a peculiarly indented and roughened outer or tread surface to prevent slip of the tire on muddy roads or wet pavements or in turning corners without interfering with the free running of the tire, and preferably such tire will have a smooth inner surface for close contact with the rim of the wheel to which it is attached.

The nature of my invention will be best understood after a detailed description of the same, and the particular features which I claim as of my invention will be pointed out in the claims at the end of this specification.

Figure 1:
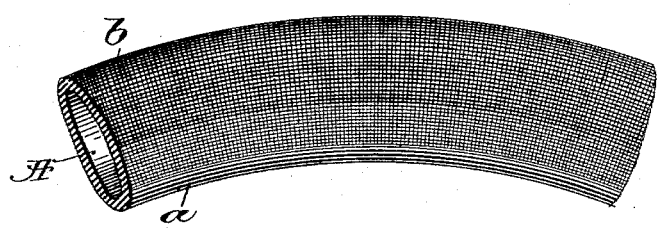
Figure 3:
Figure 2:
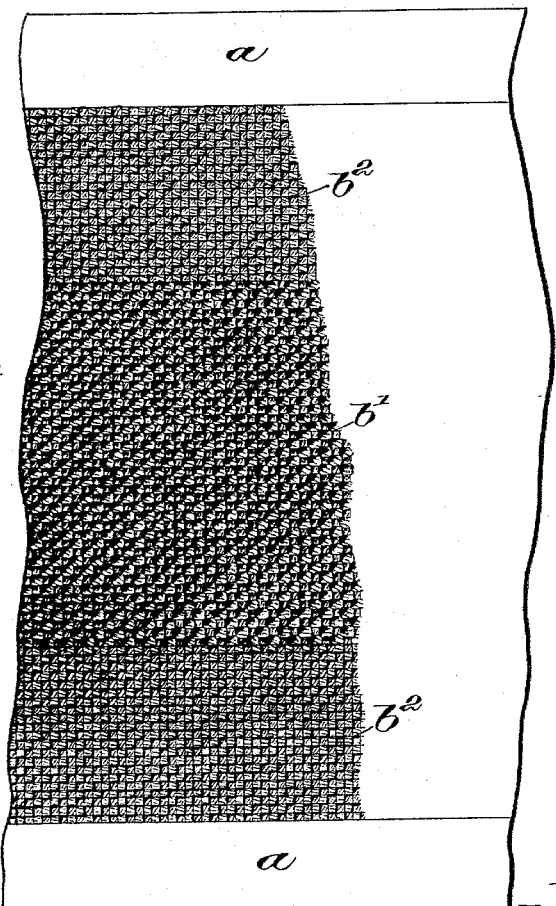

In the drawings, Figure 1 shows a short length of a tire embodying my invention. Fig. 2 shows on an enlarged scale a portion of the tire slitted longitudinally at its under side and laid out flat, and Fig. 3 is an enlarged sectional detail illustrating the nature of the indentations and projections at the tread-surface of the tire.

Referring to the drawings, in Fig. 1 I have shown what is known as a "single-tube" tire A, the same being shown as provided at its under side with a smooth rim-surface $a$, adapted to closely and continuously contact with the wheel-rim, to which it is usually cemented or otherwise suitably affixed.

The outer or tread surface $b$ of my novel tire is, in accordance with my invention, finely indented or impressed throughout, the indentations or impressions being best shown at $b'$, Fig. 2. I prefer to form these fine indentations in the following manner, viz: The tire-tube when first built up of or containing unvulcanized rubber is arranged in ring-like form about and upon a suitable ring-like form, after which the tread or exposed outer surface of the tire or tube is covered with a suitable woven fabric, which either by inflating the tire within the thread covering fabric or by contracting the latter about and upon the tire or binding it upon the latter in suitable manner is impressed into the soft unvulcanized tread-surface of the tire, its interwoven warp and weft threads forming pockets or indentations $b'$. (Shown in Fig. 2.) While thus covered and with its tread-surface indented or impressed, as in Fig. 2, the tire is vulcanized in suitable manner, after which the thread covering fabric is removed, leaving the vulcanized tread-surface having the appearance illustrated in Fig. 2. These indentations $b'$ of course have the full impression of the warp and weft threads which appear at the surface of the thread covering fabric next the tire, and said indentations are therefore cup-shaped in cross-section—that is, they have a rounded bottom. They are substantially rectangular in outline when viewed from the outside, as in Fig. 2, and the projecting ridges between adjacent indentations have concaved sides, as best shown in Fig. 3, thereby giving to the said ridges much greater flexibility than would be possible were they of other and fuller cross-sectional outline.

By preference the warp and weft threads used are such as to produce a zigzag figure, or, in other words, the indentations are separated by parallelly-arranged zigzag ridges having broad and substantial bases converging to highly-elastic crests, these indentations being alternately arranged deep and shallow, and the indentations of each series contain depressions whose general direction of formation lies transverse to the general direction of formation of the intervening depressions in the same series. These peculiarities are due to the warp and weft threads of the fabric, although it will be understood that my tire may be made in various other ways than with a fabric and that the claims are not restricted to any particular method of manufacture.

The indentations $b'$ along the immediate line of the tread of the tire may be somewhat more pronounced or of a slightly-different and more prominent character than the indentations $b^2$ at either side of the said middle or tread portion, so that in this embodiment of my invention the tire when laid open or developed, as in Fig. 2, presents a middle indented portion. Then outside this middle portion there are indented portions of less pronounced or of slightly-different character, and then adjacent the edges the smooth rim portions $a\ a$.

In practice a tire embodying my invention as herein described is found to adhere to wet or slippery roadways much more effectively than would a smooth-tread tire; yet the free running of the tire is not interfered with, as is the case with tires provided at the tread-surface with pronounced knobs or projections, as in the usual molded tire. The peculiar shape or character of the indentations and the ridges between the same also impart to my novel tire a degree of elasticity or resiliency which is entirely lacking in other forms or types of tires.

Of course my invention is adapted to any structure of tire whether it is single or double tube or semitubular.

I do not herein claim the method described for producing this tire, as the same is fully set forth in another application, filed by me January 13, 1896, Serial No. 575,307, of which this present application is a division.

I claim—

1. The within-described flexible tire having a smooth inner or rim surface, a finely-indented and roughened outer or tread surface to prevent slip of the tire without retarding the free running of the same, the tread-surface indentations adjacent the line of tread of the said tire being more pronounced than the indentations at either side thereof and between the tread-line and the smooth inner surface, substantially as described.

2. The within-described flexible tire having its tread-surface provided throughout with closely-arranged fine indentations concaved in cross-section and substantially rectangular in surface outline, substantially as described.

3. The within-described flexible tire having a tread-surface finely indented throughout, adjacent indentations being separated by ridges having sides concaved in cross-section, whereby the walls of or ridges between said indentations furnish extremely flexible and yielding lines of contact with the roadway, substantially as described.

4. A non-slipping, elastic or yielding tire having a finely-indented tread-surface the indentations of which are separated by parallelly-arranged zigzag ridges having broad and substantial bases converging to their highly-elastic crests, substantially as described.

5. A non-slipping, elastic or yielding tire having a finely-indented tread-surface composed of a multitude of alternately-arranged deep and shallow cup-shaped depressions or indentations, substantially as described.

6. A non-slipping, elastic or yielding tire having a finely-indented tread-surface composed of a multitude of cup-shaped depressions arranged in parallel series each series containing depressions whose general direction of formation lies transversely to the general direction of formation of the intervening depressions in the same series, substantially as described.

In testimony whereof I have signed my name to this specification in the presence of two subscribing witnesses.

ROBERT COWEN.

Witnesses:
WALTER F. EARLE,
WILLARD A. BULLARD.